(12) United States Patent
Vogler

(10) Patent No.: US 7,311,007 B2
(45) Date of Patent: Dec. 25, 2007

(54) PRESSURE SENSOR

(75) Inventor: Jes Vogler, Hoeruphav (DK)

(73) Assignee: Danfoss A/S, Nordborg (DK)

( * ) Notice: Subject to any disclaimer, the term of this patent is extended or adjusted under 35 U.S.C. 154(b) by 8 days.

(21) Appl. No.: 10/538,254

(22) PCT Filed: Dec. 10, 2003

(86) PCT No.: PCT/DK03/00849

§ 371 (c)(1),
(2), (4) Date: Jun. 9, 2005

(87) PCT Pub. No.: WO2004/053449

PCT Pub. Date: Jun. 24, 2004

(65) Prior Publication Data

US 2006/0048580 A1    Mar. 9, 2006

(30) Foreign Application Priority Data

Dec. 12, 2002  (DK) .............................. 2002 01907

(51) Int. Cl.
*G01L 9/00* (2006.01)
(52) U.S. Cl. ........................................ 73/756; 257/682
(58) Field of Classification Search .................. 73/700, 73/754, 756; 257/682
See application file for complete search history.

(56) References Cited

U.S. PATENT DOCUMENTS

| 4,303,903 A | 12/1981 | Matsuoka et al. ............. 338/4 |
| 4,502,335 A | 3/1985 | Wamstad et al. .............. 73/721 |
| 4,675,643 A | 6/1987 | Tanner et al. ................... 338/4 |
| 5,333,507 A | 8/1994 | Vogler et al. .................. 73/756 |
| 5,436,491 A | 7/1995 | Hase et al. ................. 257/417 |
| 5,625,151 A | 4/1997 | Yamaguchi ................... 73/716 |
| 6,805,010 B2 * | 10/2004 | Kuhnt et al. ................... 73/756 |
| 6,871,546 B2 * | 3/2005 | Scheurich et al. ............. 73/754 |
| 2003/0151126 A1 * | 8/2003 | Scheurich et al. .......... 257/682 |
| 2005/0056097 A1 * | 3/2005 | Banholzer et al. ............ 73/700 |

FOREIGN PATENT DOCUMENTS

| EP | 0 284 633 | 10/1988 |
| EP | 0 317 664 | 5/1989 |
| EP | 1 126 260 A1 | 8/2000 |
| JP | 60-108720 | 6/1985 |

* cited by examiner

*Primary Examiner*—Andre J. Allen
(74) *Attorney, Agent, or Firm*—McCormick, Paulding & Huber LLP

(57) ABSTRACT

The invention provides a pressure sensor with a housing for a pressure sensing arrangement, e.g. a semi-conductor arrangement. The housing consists of a bottom part and an intermediate member with a through hole forming a sidewall of a cavity for the pressure sensing arrangement. A membrane is attached to the intermediate member to cover an opening of the cavity, and to allow pressure from outside to propagate into a pressure transmitting medium contained inside the housing and thus to the pressure sensing arrangement therein. The invention also provides a method of making a pressure sensor with a housing of the above-described kind.

18 Claims, 3 Drawing Sheets

PRESSURE SENSOR

CROSS REFERENCE TO RELATED APPLICATIONS

This application is entitled to the benefit of and incorporates by reference essential subject matter disclosed in international Patent Application No. PCT/DK2003/000849 filed on Dec. 10, 2003 and Danish Patent Application No. PA 2002 01907 filed on Dec. 12, 2002.

FIELD OF THE INVENTION

The present invention relates to a pressure sensor.

BACKGROUND OF THE INVENTION

Pressure sensors of the above described kind are used in numerous applications, e.g. in connection with operation of combustion engines, chemical process plants and refrigeration systems.

In semiconductor based electronic pressure sensors, a silicon chip with a semiconductor membrane area constitutes the pressure-sensing element. An extensometer is mounted to the membrane area for registering deflection in the membrane area when it is exposed to the pressure of a medium.

In the heretofore known pressure sensors, the silicon chip is typically mounted on a base made of glass. The chip arrangement, constituted by the silicon chip and the glass base, is mounted in a housing comprising a membrane for separation of the silicon chip from the medium. The separating membrane and housing form a sealed space surrounding the chip arrangement. This space is normally filled completely with a pressure-transmitting medium, e.g. silicon oil through which pressure can propagate. In order to transmit the pressure substantially without pressure-loss, the pressure-transmitting medium inside the housing must have a low compressibility. When the separating membrane is exposed to a pressure, the pressure will be transmitted to the silicon chip and cause a deflection of the semiconductor membrane, which deflection is detected by the extensometer.

The required tolerances of the housing are narrow and, accordingly, expensive and time-consuming manufacturing processes have traditionally been used in making pressure sensors of the above-mentioned kind. Typically, the housing, and in particular the cavity therein, is made in a time consuming milling process wherein material is removed from a solid piece of a steel block, or the housing is made by sintering with subsequent machining. Inevitably, this occupies expensive production facilities for a relatively long time.

Since the pressure-transmitting medium normally changes volume differently from the housing when exposed to a change in temperature, the pressure signal deriving from the semiconductor arrangement depends on the temperature. i.e. in response to a specific change in temperature, the volume of the chamber, and the volume of the pressure-transmitting medium changes differently. Since the chamber is completely filled with an incompressible medium, and since the chamber is sealed, the volumetric differences must be compensated by deflection of the flexible membrane thereby introducing a deviation in the pressure signal which deviation depends on the flexibility of the membrane and the temperature. Normally, the semiconductor arrangement is electrically connected to an electronic circuit comprising an arrangement for compensating the temperature caused deviation. Such compensating arrangement is, however, expensive and requires space, and the dimension thereof depends on the necessitated degree of compensation.

In order to reduce the deviation caused by a changing temperature, it is sometimes attempted to limit the amount of free space around the semiconductor in the cavity. The limited space reduces the amount of pressure-transmitting medium necessary to fill up the cavity and thus reduces the impact of changes in the temperature. Both U.S. Pat. Nos. 5,436,491 and 4,502,335 disclose pressure sensors of this kind. These kinds of refined sensors comprise housings made from moulded or machined body casings and further comprise moulded fillers to reduce the free space in the cavity. The design and corresponding manufacturing costs of the sensors are even higher than the costs of making the aforementioned traditional sensors, and the use of fillers introduce additional manufacturing steps.

SUMMARY OF THE INVENTION

It is an object of the present invention to solve problems associated with the manufacturing of pressure sensors. Accordingly, the invention in a first aspect provides a pressure sensor of the kind mentioned in the introduction, characterised in that the housing comprises an intermediary member attached between the bottom part and the membrane and comprising an aperture forming at least a part of the cavity.

Due to the use of an intermediary member attached between the bottom part and the membrane, the housing can be made in simple and fast production steps e.g. by stamping or punching the bottom part, the intermediary member and/or the membrane out of plate shaped bodies, and subsequently assembling the parts, e.g. by welding. The aperture in the intermediary member may e.g. form part of the sidewall of the cavity. The intermediary member may be formed by any number of parts. It may have a laminated structure made from a plurality of discs or it may be formed from sectors of semicircular disc segments joint by welding.

If it is desired to limit the amount of the pressure-transmitting medium, e.g. to reduce the need for compensation of the signal from the sensor, the spacing around the pressure sensing arrangement in the cavity can easily be reduced. In this case, the intermediate member can be made with an aperture having a cross sectional profile matching the profile of the pressure sensing arrangement in a corresponding cross-sectional view. When the intermediate member is attached between the bottom part and the membrane, the aperture forms a sidewall of the cavity, and due to the matching cross-sectional profiles of the aperture and the pressure sensing arrangement, the amount of pressure-transmitting medium necessary to fill up the cavity is reduced. The possibly somewhat tortuous profile of the aperture can be made in the intermediary member using any convenient process known in the art, e.g. a stamping process, and it is thus possible to make the profile at a high speed even within narrow dimensional tolerances. If additional space is required for electrical connections between the pressure sensing arrangement and external equipment, the aperture could be punched in any shape and thus provide the necessary space for such additional components.

As an example, it may be desired to arrange connecting pins through the bottom part and into the cavity for establishing electrical connections through the housing. The openings in the bottom part may be punched or stamped in one and the same operation in which the general shape of the bottom part is made and the intermediary member may have an aperture, e.g. with a cross sectional shape as a star, leaving space in the middle for a pressure sensing arrangement and space in the projecting points or fingers of the star for the connecting pins.

In a specifically simple and easily manufactured embodiment, the intermediary member and the bottom part are joined in matching plane surfaces. The bottom part and/or the intermediary member could be made from a plate shaped material, e.g. of a non-corrosive material such as stainless steel, a ceramic material or Kovar. Similarly, the membrane could be made from a disc of stainless steel.

The bottom part and the intermediary member could be joined by laser welding, Electron Beam Welding (EBW), Wolfram Inert gas welding (WIG), resistance welding or by soldering or gluing. The membrane could be fastened to the intermediary member by any similar process, e.g. by use of a ring extending circumferentially around the outer peripheral edge of the membrane and preferably overlapping this edge.

Preferably, the pressure sensing arrangement is a semiconductor arrangement having a base, e.g. made of glass.

A conduit for filling the cavity with the pressure-transmitting medium, e.g. silicone oil, may be made as a penetration through one of the bottom part and the intermediary member. The hole could be sealed with a closure having the shape of a spherical ball and being fastened to the hole via welding, e.g. resistance welding. Such welding may be conducted with the housing submersed into silicon oil. In one embodiment, the conduit is formed between the bottom part and the intermediary member, e.g. by making a groove in the surface wherein the intermediary member and the bottom part are joined.

Electrically conductive pins entering into the cavity e.g. through holes in the bottom part or in the intermediary member for electrically connecting the semiconductor arrangement with outside equipment may preferably be electrically isolated from the bottom part or intermediary member, in particular if the bottom part or intermediary member is made from an electrically conductive material.

The membrane could be attached to a first contact flange of an upper surface of the intermediary member, i.e. opposite the surface where the intermediate member is attached to the base part, e.g. by welding, gluing or by similar assembling processes. In order to ensure a more solid fixation of the membrane to the intermediary member, a supporting ring could be fastened on top of the membrane, e.g. in a welding operation wherein the supporting ring is welded to the membrane, and to the intermediary member.

In order to reduce contact between the membrane and the intermediary member, the first contact flange may form a circumferentially extending elevation of the upper surface allowing the membrane to rest on the contact flange and to remain unsupported by the remaining part of the intermediary member.

In a similar manner, the supporting ring may have a second contact flange of a lower surface thereof, i.e. on a surface opposite to an upper and outer surface of the supporting ring when attached to the membrane and to the intermediary member. The second contact flange is attached to an outer surface of the membrane above the first contact flange, and in order to reduce contact between the membrane and the supporting ring, the second contact flange may form a circumferentially extending elevation of the lower surface.

According to a second aspect, the present invention relates to a method of making a pressure sensor comprising a housing with a cavity having an opening in an upper surface of the housing, a pressure sensing arrangement placed in the cavity for sensing pressure, and a membrane covering the opening and attached to the housing to provide a substantially closed space in the cavity, wherein a bottom part and an intermediary member is assembled to form the housing, characterized in that the membrane is attached to a contact face of the intermediary member.

In particular, one of the bottom part and the intermediary member may be formed in a stamping process.

The method may be combined with any step necessary for making any of the aforementioned embodiments of a pressure sensor.

BRIEF DESCRIPTION OF THE DRAWINGS

In the following, the invention will be described in further details with reference to the drawing in which.

DETAILED DESCRIPTION OF THE PREFERRED EMBODIMENTS

Figure 1:
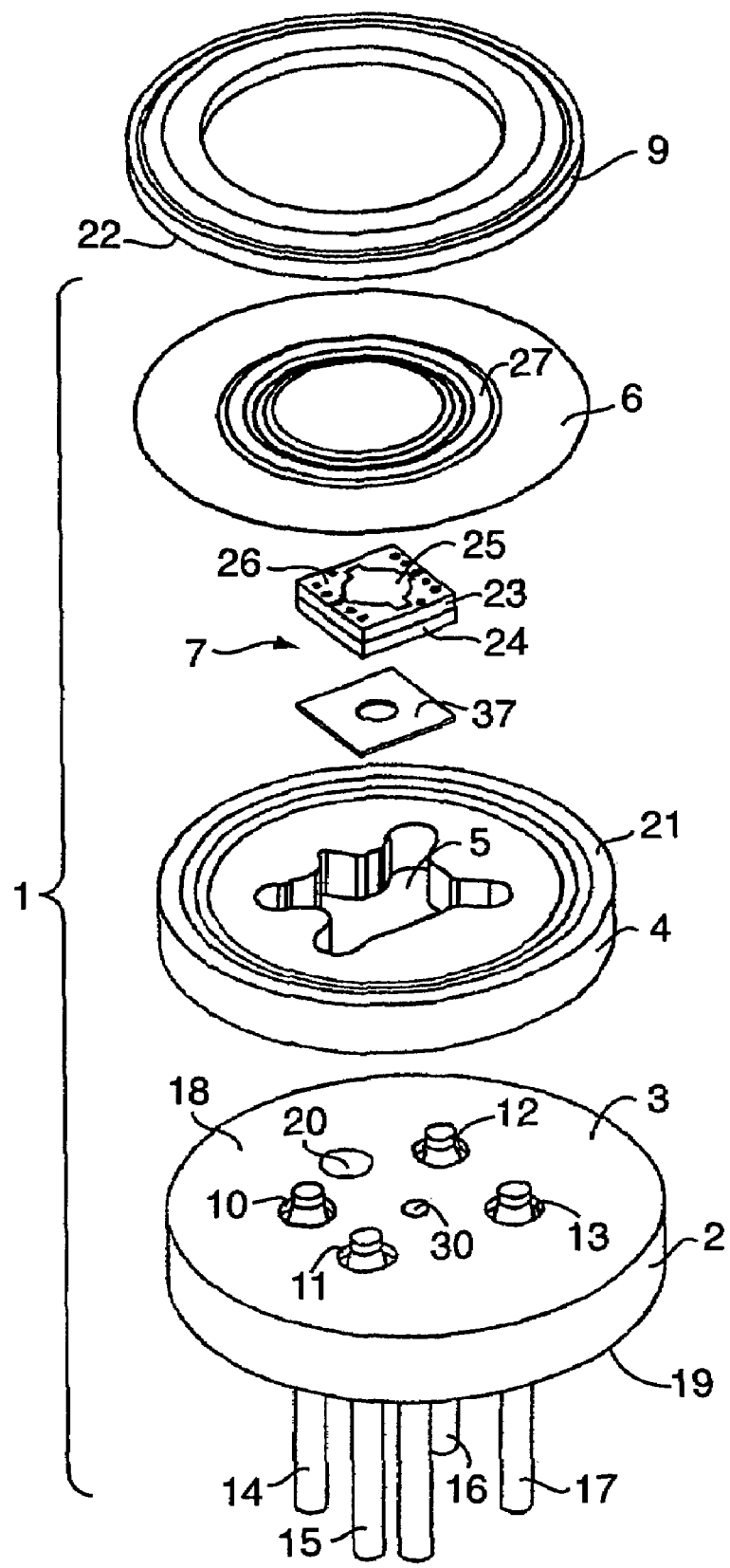
FIG. 1 shows an exploded view of a first preferred embodiment of a pressure sensor according to the present invention.

FIG. 1 shows an exploded view of an electronic silicon-based pressure sensor 1 comprising a housing made from a plate shaped bottom part 2 fastened on a first surface 3 to a plate shaped intermediary member 4. The intermediary member is penetrated by an aperture 5 forming, in combination with the bottom part 2 and a flexible membrane 6, a closed cavity (numeral 28 in FIG. 2) for housing a semiconductor arrangement 7. The bottom part comprises a base for fastening the semiconductor arrangement to the bottom part. The pressure sensor further comprises a supporting ring 9. The bottom part 2 has the shape of a circular disc made with four holes 10-13 penetrating the bottom part to form apertures into the cavity. Electrically conductive pins 14-17 are arranged and fixed to the apertures via an electrically isolating glass material (shown in FIG. 2). Each pin is held in a position wherein a smaller part of the pin projects out from the upper surface 18 of the bottom part 2 whereas a larger part extends from the opposite lower surface 19 of the bottom part. Each pin is, moreover, positioned so that they do not touch the inner surfaces of the apertures. In addition to the four holes, an oil-channel 20 for filling the cavity with a pressure-transmitting medium such as silicon oil is made in the bottom part. The oil-channel is formed by a hole penetrating the bottom part, and which has a circular cross-sectional shape. The pressure channel 30 is described in further details later.

The contact flange 21 forms a circumferentially extending elevation of the upper surface of the intermediary member. In a corresponding manner, the contact flange 22 of the supporting ring also forms a circumferentially extending elevation of the lower surface of the supporting ring.

The elevated flanges 21, 22 provide free space between the membrane and the intermediary member and supporting ring, respectively. The free space is better seen in FIG. 2.

The elevated flanges are introduced in order to reduce contact between the membrane and the intermediary member and the supporting ring to a minimum, i.e. so that contact merely exists along an outer peripheral edge of the parts whereby the movement of the membrane is less influenced by the housing.

The semiconductor arrangement is fastened to the base by glue 37. The semiconductor arrangement comprises a chip 23 and a glass base 24 joined via an electrostatic process. In one area, the chip 23 forms a semiconductor membrane 25, i.e. the thickness of the chip is relatively low. The membrane may be circular, quadrangular or it may have other shapes. The area of the semiconductor membrane deflects upon impact of a force and the size of the defection is determined by extensometers in a manner known per se. The semiconductor arrangement is connected to the pins via electrically conductive wires (not shown). Via the wires and the electrically conductive pins, it is possible to transmit a signal representing the deflection of the membrane out of the housing of the pressure sensor. In the disclosed embodiment, the semiconductor arrangement has a rectangular cross sectional profile but semiconductors with alternative profiles exist. Corresponding to the bottom part, the intermediary member has the shape of a circular disc. The intermediary member is made with a hole 5 forming an aperture in the housing, which aperture is sealed by the flexible membrane. As it appears from FIG. 4, the inner cross-sectional shape of the aperture is fitted to the outer cross sectional shape of the semiconductor arrangement and the pins. The pins are arranged to form corner points of a rectangle around the semiconductor arrangement, which semiconductor arrangement thereby forms the centre of the rectangle.

The thickness of the intermediary member corresponds substantially to the distance from the upper surface 26 of the semiconductor arrangement to the upper surface 18 of the bottom part. The membrane 6 is a thin circular plate with concentric corrugations 27 which enhance the stiffness of the membrane and which gives the membrane substantially linear pressure/displacement characteristics. The supporting ring 9 has the shape of a circular ring. The supporting ring 9, the intermediary member 4, the bottom part 2 and the membrane 6 are made from an anti corrosive material, e.g. stainless steel. Stainless steel is preferred since it facilitates assembling of the parts by welding but other materials which are suitable for the applied pressures of a specific application could be considered.

The shape of the bottom part, the intermediary member and the membrane is chosen to facilitate an easy manufacturing, e.g. in a stamping or punching process.

Figure 2:
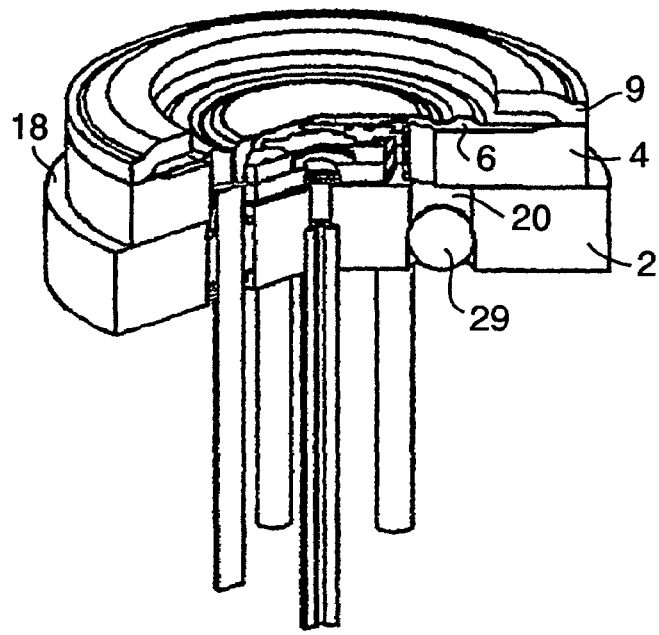
FIG. 2 shows an isometric view of the pressure sensor of FIG. 1, when it is assembled.

FIG. 2 shows an isometric, cross-sectional view of the assembled pressure sensor. The semiconductor arrangement is arranged in the rectangle formed by the pins. The intermediary member is attached to the bottom part e.g. by welding, e.g. laser welding so that it encircles the semiconductor arrangement and the parts of the pins which project out of the upper surface 18 of the bottom part. The membrane 6 is arranged concentrically on top of the intermediary member, and by means of the supporting ring 9, it is welded onto the intermediary member. The elevated flanges of the intermediary member and of the supporting ring which have been introduced to reduce contact between the membrane and the intermediary member and the supporting ring to a minimum, are clearly seen in FIG. 2.

The cavity 28 created by the housing and the membrane is filled with a pressure-transmitting medium, e.g. silicone oil which is injected through the oil channel 20, and subsequently, the channel is sealed with a closure ball 29. The closure ball could be made in a dimension so that it must be pressed into the opening whereby a tight sealing is provided, or the ball could be attached in the opening e.g. by welding, e.g. by resistance welding thereby forming a sealed cavity in the housing.

The measuring of the pressure is carried out when the membrane 6 is subjected to a pressure, e.g. when the pressure sensor is mounted in a pressure pipe, e.g. in a chemical process plant. The pressure deflects the membrane 6 and propagates via the silicon oil to the semiconductor arrangement. In the semiconductor arrangement, the deflection of the semiconductor membrane area is sensed by the extensometer, and a signal representing the pressure is transmitted out of the pressure sensor via the pins.

Figure 3:
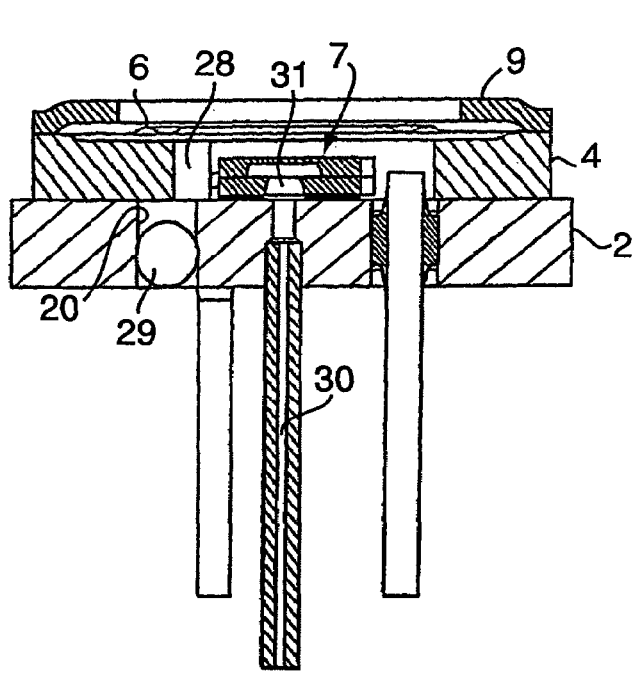
FIG. 3 shows a cross-sectional view of the pressure sensor of FIG. 1.

FIG. 3 shows a cross-sectional view of the pressure sensor of FIG. 2. As shown the sensor includes a pressure channel 30 establishing fluid communication between a reference pressure chamber 31 of the semiconductor arrangement 7 and a reference pressure medium, e.g. the surrounding atmosphere. Due to channel 30, the semiconductor membrane 25 deflects according to a pressure difference between the pressure in the reference pressure chamber (atmospheric pressure) and the pressure of the medium acting on the membrane 6. The pressure channel 30 is optional, but if present it provides atmospheric pressure in the reference pressure chamber 31. If the pressure channel is omitted the reference pressure chamber is typically evacuated and sealed, thereby providing a substantially fixed reference pressure corresponding to substantially zero pressure.

Figure 4:
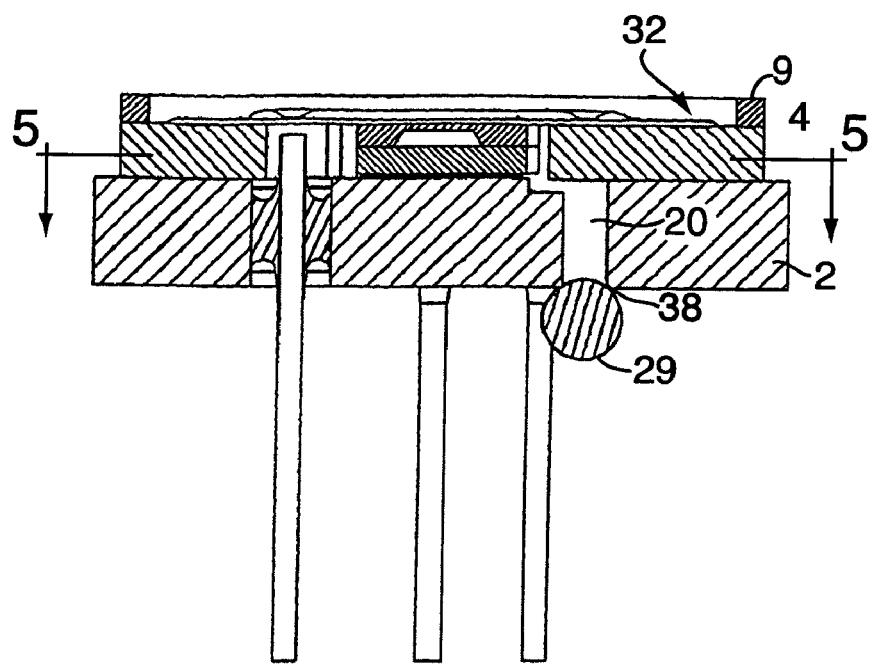
FIG. 4 shows a cross-sectional view of an alternative embodiment of a pressure sensor.
Figure 5:
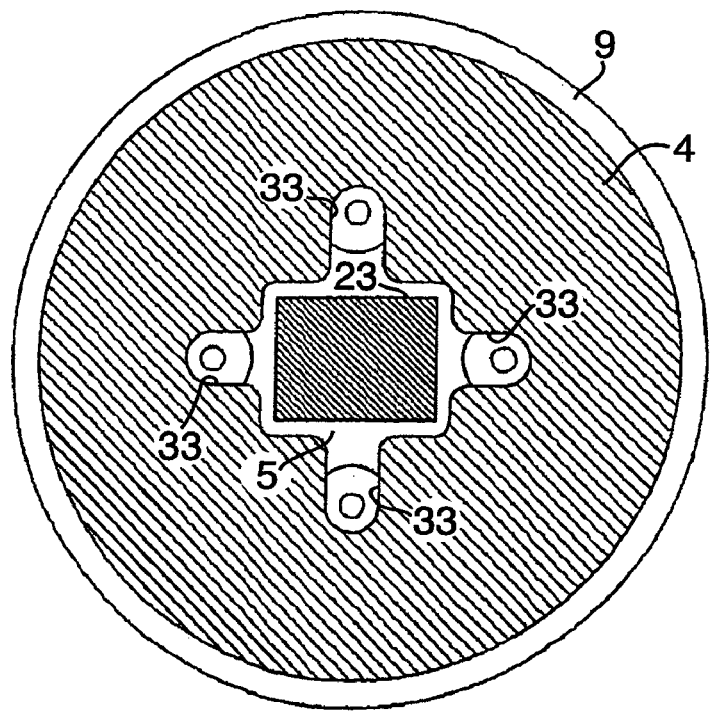
FIG. 5 shows a cross-sectional view of the pressure sensor along 5-5 in FIG. 4, and FIGS. 6 and 7 show sectional views of alternative embodiments of the pressure sensor.

FIGS. 4 and 5 show an alternative embodiment wherein the closure ball 29 is larger than the corresponding ball of the previous embodiments. The ball is fastened in the opening by welding along the joint 38 to completely seal the oil channel 20. Also the intermediary member 4, and the supporting ring 9 are different from those of FIGS. 1-3. In this case the upper surface of the intermediary member as well as the lower surface of the supporting ring are plane. i.e. the contact flanges are not elevated from the upper surface of the intermediary member and the lower surface of the supporting ring. In order to reduce contact between the membrane and the other parts, i.e. the intermediary member and supporting ring, respectively, the membrane comprises a fold 32 raising the middle portion of the membrane from the intermediary member.

In FIG. 4, it is clearly seen that the pressure sensor of this embodiment is made for measuring absolute pressure, i.e. the sensor is made without the pressure channel.

In FIG. 5, it is clearly seen that the through hole in the intermediary member has a shape corresponding to the shape of the semiconductor arrangement, i.e. a quadrangular shape. For each connecting pin, projecting points or fingers 33 extend radially outwardly to incorporate these pins into the cavity. The reduced volume resulting from the matching shapes of the through hole and the objects within the cavity improves the sensor since it reduces the amount of pressure-transmitting oil necessary for filling up the cavity and thus reduces the need for compensation of temperature caused deviation.

Figure 6:
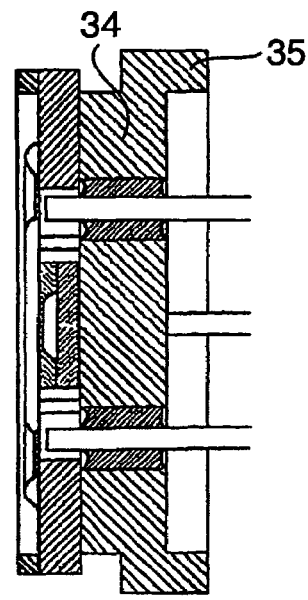

FIG. 6 shows an alternative embodiment of the pressure sensor wherein the bottom part 34 is made with a recessed flange forming an apron ring 35 circumferentially around the outer surface of the flange. The apron ring could be welded to the inner surface e.g. of a pressure pipe (not shown). In the shown embodiment, the bottom part is formed with an axially displaced flange whereby the welding surface in a similar manner is displaced axially in relation to the embodiment of FIGS. 1-5. By the axial displacement, the distance between the silicone filled cavity and the outer surface is increased. Since only a fraction of the heat propagates to the cavity, the increased distance facilitates welding with an increased effect without thermally overloading the silicone oil. In accordance with the invention, the geometry of the bottom part is still simple and can be made in a stamping or punching process.

Figure 7:
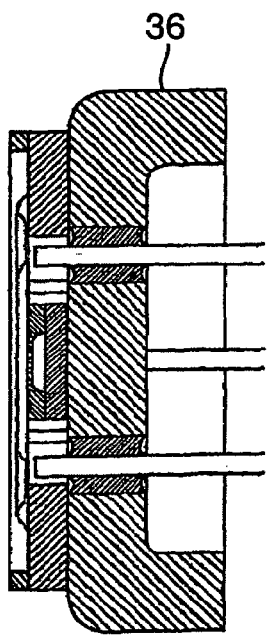

FIG. 7 shows a third embodiment of the pressure sensor. The bottom part is similarly made with a recessed flange but the outer surface of the flange is provided with an increased area of the surface 36 when compared to the embodiments of FIGS. 1-5. The increased area provides a larger welding surface enabling a stronger welding, e.g. necessitated by large pressures to be measured. To avoid thermal overloading of the silicone oil, it may be necessary to cool down the pressure sensor during the welding process. Also this geometry of the bottom part may be produced in a cost efficient way by stamping or punching.

The pressure sensor housings disclosed in any of the figures are made by at least 3 parts. The bottom part and the intermediary member are made as two separate pieces joined by welding. This facilitates a simple manufacturing in a punching or stamping process and thus makes it possible to lower the manufacturing costs.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A pressure sensor comprising:
   a housing with a bottom part and a sidewall extending upwardly and forming an opening in an upper surface of the housing;
   a pressure sensing arrangement; and
   a membrane covering the opening to provide a substantially closed cavity in the housing;
   wherein the housing includes a substantially plate-shaped intermediary member attached between the bottom part and the membrane and having an aperture extending therethrough, the aperture forming at least a part of the cavity.

2. The sensor according to claim 1, wherein the intermediary member forms the sidewall of the cavity.

3. The sensor according to claim 1, wherein the aperture has a profile matching a profile of the pressure sensing arrangement when viewed in the same cross-sectional plane.

4. The sensor according to claim 1, wherein the intermediary member and the bottom part are joined in matching plane surfaces.

5. The sensor according to claim 1, wherein the intermediary member is attached to the bottom part by welding.

6. The sensor according to claim 1, wherein the membrane is fastened to the intermediary member.

7. The sensor according to claim 1, wherein the intermediary member is made in a stamping process.

8. A pressure sensor comprising:
   a housing with a bottom part and a sidewall extending upwardly and forming an opening in an upper surface of the housing;
   a pressure sensing arrangement; and
   a membrane covering the opening to provide a substantially closed cavity in the housing;
   wherein the housing comprises an intermediary member attached between the bottom part and the membrane and comprising an aperture forming at least a part of the cavity; and
   wherein a channel for filling the cavity with a pressure-transmitting medium extends through the housing.

9. The sensor according to claim 1, wherein the membrane is attached to a first contact flange of an upper surface of the intermediary member, the first contact flange forming a circumferentially extending elevation of the upper surface.

10. A pressure sensor comprising:
    a housing with a bottom part and a sidewall extending upwardly and forming an opening in an upper surface of the housing;
    a pressure sensing arrangement; and
    a membrane covering the opening to provide a substantially closed cavity in the housing;
    wherein the housing comprises an intermediary member attached between the bottom part and the membrane and comprising an aperture forming at least a part of the cavity;
    wherein the membrane is attached to a first contact flange of an upper surface of the intermediary member, the first contact flange forming a circumferentially extending elevation of the upper surface; and
    wherein a supporting ring is attached to an outer surface of the membrane, the supporting ring having a second contact flange on a lower surface of the supporting ring, the second contact flange being attached to the outer surface of the membrane above the first contact flange, the second contact flange forming a circumferentially extending elevation of the lower surface.

11. A method of making a pressure sensor, the method comprising:
    assembling a bottom part and an intermediary member to form a housing with a cavity defined therein, the cavity having an opening in the upper surface of the housing; and
    attaching a membrane to the housing to cover the opening;
    wherein the intermediary member is attached between the bottom part and the membrane and forms at least a part of the cavity; and
    wherein at least one of the bottom part and the intermediary member is formed in a stamping process.

12. The sensor according to claim 2, wherein the pressure sensing arrangement and the sidewall extend upwardly from the bottom part to an approximately equal height.

13. The sensor according to claim 3, wherein the pressure sensor includes a plurality of connecting pins extending through the housing into portions of the cavity, each of the portions of the cavity into which the connecting pins extend being at least partially formed by a discrete projection extending from a central portion of the aperture.

14. The sensor according to claim 8, wherein at least a portion of the channel extends through the bottom part.

15. The sensor according to claim 8, wherein the intermediary member and the bottom part are joined along matching surfaces.

16. The sensor according to claim 15, wherein the channel extends between the matching surfaces.

17. The sensor according to claim 16, wherein at least a portion of the channel is formed by a groove in at least one of the matching surfaces.

18. The method according to claim 11, further comprising substantially filling the cavity with a pressure-transmitting medium after attaching the membrane to the housing to cover the opening.

* * * * *